United States Patent
Lumbatis

(10) Patent No.: US 12,557,011 B2
(45) Date of Patent: Feb. 17, 2026

(54) ASSOCIATION AND RE-ASSOCIATION REQUEST STATION STEERING UTILIZING CONTROLLER DIRECTION

(71) Applicant: Ruckus IP Holdings LLC, Claremont, NC (US)

(72) Inventor: Kurt A. Lumbatis, Dacula, GA (US)

(73) Assignee: Ruckus IP Holdings LLC, Horsham, PA (US)

( * ) Notice: Subject to any disclaimer, the term of this patent is extended or adjusted under 35 U.S.C. 154(b) by 352 days.

(21) Appl. No.: 18/139,545

(22) Filed: Apr. 26, 2023

(65) Prior Publication Data

US 2023/0362806 A1    Nov. 9, 2023

Related U.S. Application Data

(60) Provisional application No. 63/337,644, filed on May 3, 2022.

(51) Int. Cl.
*H04W 48/20*  (2009.01)
*H04W 24/02*  (2009.01)
(Continued)

(52) U.S. Cl.
CPC ........... *H04W 48/20* (2013.01); *H04W 24/02* (2013.01); *H04W 24/10* (2013.01); *H04W 28/0942* (2020.05); *H04W 48/16* (2013.01)

(58) Field of Classification Search
CPC . H04W 24/02; H04W 24/10; H04W 28/0942; H04W 48/16; H04W 48/20
See application file for complete search history.

(56) References Cited

U.S. PATENT DOCUMENTS

2008/0096575 A1   4/2008  Aragon et al.
2019/0075469 A1*  3/2019  Mahoney ............. H04B 17/318
(Continued)

FOREIGN PATENT DOCUMENTS

CN    102196499     9/2011
EP    2 802 177     11/2014
WO    2014/194492   12/2014

OTHER PUBLICATIONS

International Preliminary Report on Patentability dated Oct. 29, 2024 in International (PCT) Application No. PCT/US2023/019938.
(Continued)

*Primary Examiner* — Kevin C. Harper
(74) *Attorney, Agent, or Firm* — Myers Bigel, P.A.

(57) ABSTRACT

Managing an association of a wireless device to an access point device of a wireless network is disclosed. A client device sends an association request frame to one or more access point devices that is directed to a target access point device. A network controller device receives an association request event from each access point device that received an association request frame. The network controller device can select a preferred access point device based on one or more steering parameters of the associated request events. The network controller device sends the target access point device the preferred access point device as indicated by one or more preferred access point device parameters. The target access point device sends an association response frame to the client device that indicates the preferred access point device so as to steer the client device to the preferred access point device.

20 Claims, 7 Drawing Sheets

(51) Int. Cl.
*H04W 24/10* (2009.01)
*H04W 28/08* (2023.01)
*H04W 48/16* (2009.01)

(56) References Cited

U.S. PATENT DOCUMENTS

2021/0282022 A1* 9/2021 Hathiramani ......... H04W 16/14
2024/0406909 A1* 12/2024 Shreevastav .......... G01S 5/0036

OTHER PUBLICATIONS

International Search Report and Written Opinion issued Jul. 3, 2023 in International Application No. PCT/US2023/019938.

* cited by examiner

ASSOCIATION AND RE-ASSOCIATION REQUEST STATION STEERING UTILIZING CONTROLLER DIRECTION

BACKGROUND

More and more devices are capable of communicating wirelessly and the functionality available on wireless devices continues to increase. Wireless communications may be between wireless devices and/or with the Internet. The wireless communications between wireless devices may be accomplished using one or more wireless protocols. For example, wireless devices may communicate directly with one another using Bluetooth (Institute of Electrical and Electronics Engineers (IEEE) 802.15.1). Alternatively, wireless devices may communicate with each other or with the Internet via a wireless local area network, such as wireless fidelity (Wi-Fi) (IEEE 802.11). To communicate via a Wi-Fi network, the Wi-Fi devices may directly connect to the Wi-Fi network via an access point (e.g., router). Bluetooth devices may connect to the Wi-Fi network utilizing a Bluetooth-Wi-Fi bridge.

The wirelesses devices may be capable of connecting to the Internet and accessing various networks, systems and/or content either via the Internet or a direct connection (e.g., secure link). The wireless devices may connect to the Internet either via a mobile network or via a local area network providing wireless communications, often referred to as a wireless network or a Wi-Fi network. The Wi-Fi network is typically connected to a broadband network and the broadband network connects to the Internet and may be capable of providing a secure link to other networks, systems and/or content.

To provide an enhanced user experience when a wireless device is connected to the network, a unique identifier is required to track the wireless device throughout the network. With the advent of randomized and changing media access control (MAC) addresses and to ease the burden on network controllers, using probe requests to determine the best association point for a wireless device by a network controller has become unfeasible. The steering of wireless devices can be problematic in that each time the wireless device associates with the network or with each probe request, the wireless device can use a different MAC address which may differ from a previously used MAC address. Thus, there is a need to provide an improved steering for wireless devices in a network.

SUMMARY

To provide an improved steering of a wireless device, novel solutions are provided for a network controller device to steer a wireless device by utilizing the reception of an association or re-association request frame (collectively referred to as an association request frame) from a wireless device, such as a station, to an access point device with reception data received by the access point device to which the association is directed as well as the same frame being received by co-located access point devices in the network. As the association request frame is a directed packet and the IEEE 802.11 standard mandates that a wireless device shall utilize a constant MAC address for the duration of an association, the MAC address can be utilized by the network controller device to track the wireless device for the duration of the association. Additionally, co-located access point devices which often utilize the same channel can receive this association request frame to forward to the network controller device.

An aspect of the present disclosure is drawn to a method for steering a wireless device to a preferred access point device in a wireless network. The method comprises receiving, from a plurality of access point devices, a plurality of association request events associated with an association request frame received by the plurality of access point devices from the wireless device, wherein the plurality of association request events comprise one or more steering parameters, wherein the one or more steering parameters comprise a target access point device indicator that indicates a target access point device of the plurality of access point devices to which the association request frame was directed, selecting the preferred access point device, from the plurality of access point devices, for steering the wireless device to based on at least one of the one or more steering parameters, and sending one or more preferred access point device parameters to the target access point device, wherein the one or more preferred access point device parameters comprise the preferred access point device indicative of the preferred access point device, a radio associated with the preferred access point device, or both.

In an aspect of the present disclosure, the method further comprises predicting a channel load of each of the plurality of access point devices, one or more radios corresponding to any of the plurality of access point devices, or both based on one or more of the one or more steering parameters, wherein the selecting is based on the predicted channel load.

In an aspect of the present disclosure, the method further comprises at least one of determining a load capacity of each of the plurality of access point devices based on the one or more steering parameters, and determining a signal strength of each of the one or more association event requests based on any of the one or more steering parameters, wherein the predicting the channel load is based on the load capacity, the signal strength, or both.

In an aspect of the present disclosure, the method is such that selecting the preferred access point device comprises comparing the one or more steering parameters to determine a predicted network performance associated with each of the plurality of access point devices.

In an aspect of the present disclosure, the method further comprises storing the one or more preferred access point device parameters, wherein the one or more preferred access point device parameters comprise a time period, wherein the time period indicates a period of time that the one or more access point device parameters are valid.

In an aspect of the present disclosure, the method further comprises receiving, from at least one of the plurality of access point devices, one or more subsequent association request events associated with a subsequent association request frame received by the at least one of the plurality of access point devices, wherein the one or more subsequent association request events comprise one or more subsequent steering parameters, wherein the one or more subsequent steering parameters comprise a subsequent target access point device indicator that indicates a subsequent target access point device to which the subsequent association request frame was directed, determining that the one or more subsequent association request events are associated with the wireless device, determining that the time period associated with the stored one or more preferred access point device parameters associated with the preferred access point device has not expired, and sending the one or more preferred access point device parameters to the subsequent target access point device based on the subsequent target access point device indicator so as to steer the wireless device to or allow the wireless device to associate with the preferred access point device.

In an aspect of the present disclosure, the method is such that the preferred access point device is the same as the target access point device.

An aspect of the present disclosure is drawn to a network controller device for steering a wireless device in a wireless network. The network controller device comprises a memory storing one or more computer-readable instructions, and a processor coupled to the memory. The processor is configured to execute the one or more computer-readable instructions to cause the network controller device to receive, from a plurality of access point devices, a plurality of association request events associated with an association request frame received by the plurality of access point devices from the wireless device, wherein the plurality of association request events comprise one or more steering parameters, wherein the one or more steering parameters comprise a target access point device indicator that indicates a target access point device of the plurality of access point devices to which the association request frame was directed, select the preferred access point device, from the plurality of access point devices, for steering the wireless device to based on at least one of the one or more steering parameters, and send one or more preferred access point device parameters to the target access point device, wherein the one or more preferred access point device parameters comprise the preferred access point device indicative of the preferred access point device, a radio associated with the preferred access point device, or both.

In an aspect of the present disclosure, the processor is further configured to execute the one or more computer-readable instructions to further cause the network controller device to predict a channel load of each of the plurality of access point devices, one or more radios corresponding to any of the plurality of access point devices, or both based on one or more of the one or more steering parameters, wherein the selecting is based on the predicted channel load.

In an aspect of the present disclosure, the processor is further configured to execute the one or more computer-readable instructions to further cause the network controller device to at least one of determine a load capacity of each of the plurality of access point devices based on the one or more steering parameters, determine a signal strength of each of the one or more association event requests based on any of the one or more steering parameters, wherein the predicting the channel load is based on the load capacity, the signal strength, or both.

In an aspect of the present disclosure the selecting the preferred access point device comprises comparing the one or more steering parameters to determine a predicted network performance associated with each of the plurality of access point devices.

In an aspect of the present disclosure, the processor is further configured to execute the one or more computer-readable instructions to further cause the network controller device to store the one or more preferred access point device parameters, wherein the one or more preferred access point device parameters comprise a time period, wherein the time period indicates a period of time that the one or more access point device parameters are valid.

In an aspect of the present disclosure, the processor is further configured to execute the one or more computer-readable instructions to further cause the network controller device to receive, from at least one of the plurality of access point devices, one or more subsequent association request events associated with a subsequent association request frame received by the at least one of the plurality of access point devices, wherein the one or more subsequent association request events comprise one or more subsequent steering parameters, wherein the one or more subsequent steering parameters comprise a subsequent target access point device indicator that indicates a subsequent target access point device to which the subsequent association request frame was directed, determine that the one or more subsequent association request events are associated with the wireless device, determine that the time period associated with the stored one or more preferred access point device parameters associated with the preferred access point device has not expired, and send the one or more preferred access point device parameters to the subsequent target access point device based on the subsequent target access point device indicator so as to steer the wireless device to or allow the wireless device to associate with the preferred access point device.

In an aspect of the present disclosure, the preferred access point device is the same as the target access point device.

An aspect of the present disclosure provides a computer readable medium of a network controller device having one or more computer-readable instructions stored thereon. The one or more computer-readable instructions when executed by a processor of the network controller device, cause the network controller device to perform one or more operations including the steps of the methods described herein.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

When a wireless device wants to connect to a Wi-Fi network, the wireless device sends an association request frame to the network. The association request frame may be received by all of the access point devices of the network that are within range and operate at an appropriate frequency band. The access point devices that receive the association request frame from the wireless device, and have the ability to accept or otherwise associate the wireless device, provide a response to the association request. The wireless device, however, may select an access point device that does not ensure a best quality of experience (QoE) for the wireless device or the network as a whole. This is because the wireless device does not know various parameters about the network including, for example, congestion of each of the access point devices, or possible upcoming events of the network that the network may predict based on previous actions. The wireless device may simply connect to an access point device based on a previous connection to that access point device, a received signal strength indicator (RSSI) associated with that access point device, or both even if other access point devices that have sufficient RSSI are available and would provide an enhanced QoE. For example, when a wireless device first detects a network and enters the necessary password for connection, it may connect to a certain access point device. When the wireless device subsequently connects to the network it may typically connect to the same access point device that it connected to the first time. To provide an improved steering of a wireless device, one or more aspects of the present invention utilize a network controller device for receiving an association request event from each access point device that receives an association request frame from the wireless device so that the network controller device can determine a preferred access point device from the plurality of access point devices to which to steer the wireless device so as to provide enhanced QoE.

Figure 1:
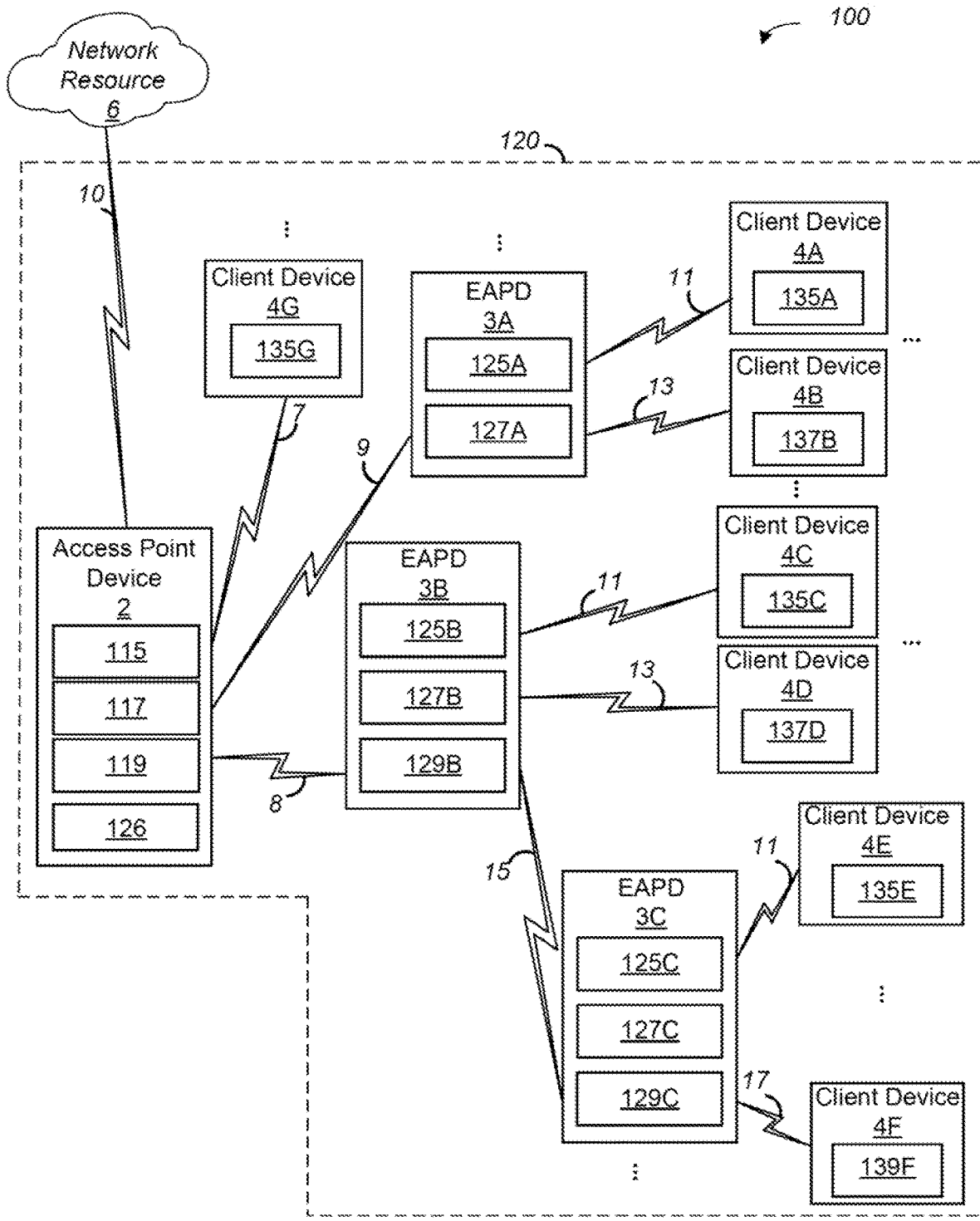
FIG. 1 is a schematic diagram of a network environment, according to one or more aspects of the present disclosure.

FIG. 1 is a schematic diagram of a steering system 100 of a network environment 120, according to one or more aspects of the present disclosure. The network environment 120 can comprise a mesh network or any other type of network that utilizes a Wi-Fi network to interconnect one or more network devices or electronic apparatuses, such as one or more wireless devices. It should be appreciated that various example embodiments of inventive concepts disclosed herein are not limited to specific numbers or combinations of network devices, and there may be one or multiple of some of the aforementioned network devices in the system, which may itself consist of multiple communication networks and various known or future developed wireless connectivity technologies, protocols, devices, and the like.

As shown in FIG. 1, the steering system 100 includes one or more wireless or network devices, such as an access point device (APD) 2 connected to a network resource 6, for example, an Internet Service Provider, the Internet, a repository, a web page, a server, a network service, any other network resource, or any combination thereof, one or more other wireless devices (for example, one or more extender access point devices (EAPD) 3 and/or one or more client devices 4, also referred to as a station) that may be connected in one or more wireless networks (for example, a private network, a guest network, an iControl, or an Internet of things (IoT) network), any other network devices, or any combination thereof. One or more network devices could be located in more than one network. For example, the wireless extender access point devices 3 could be located both in a private network for providing content and information to a client device 4 and also included in a backhaul network or an iControl network.

The access point device 2 can be, for example, a hardware electronic device that may be a combination modem and network gateway device that combines the functions of a modem, an access point (AP), a gateway, a residential gateway (RG), a broadband access gateway, a home network gateway, a router, a home router, an extender access point device 3, any other network device that comprises a network controller device 126. It is also contemplated by the present disclosure that the access point device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. Network controller device 126 can comprise software, such as one or more computer-readable instructions, for implementing one or more aspects of the present disclosure for selecting or determining a preferred access point device 2 to which to steer a wireless device, such as a client device 4. For example, the network controller device 126 can provide an improved network by steering a wireless device to a particular access point device 2 and/or frequency band (for example, a radio) of a particular access point device 2 using an association request frame received via a wireless connection from the wireless device. The association request frame is directed to a particular access point device 2 (also referred to as a target access point device) and can also be received by one or more other access point devices 2 (also referred to as candidate access point devices) in the network, such as steering system 100, according to one or more aspects of the present disclosure.

The access point device 2 can include one or more wireless interfaces, including but not limited to, one or more radios such as a 2.4 GHz radio 115, a 5 GHz radio 117, and a 6 GHz radio 119. While FIG. 1 illustrates radios 115, 117, and 119, the present disclosure contemplates any number of radios at any given frequency, such as a 60 GHz radio. The connections 7, 8 and 9 between the access point device 2 and the one or more extender access point devices 3 and/or one or more client devices 4 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizen broadband radio services (CBRS) band, 2.4 GHz bands, 5 GHz bands, 6 GHz bands, 60 GHz bands, any other bands, or any combination thereof.

The connections 8 and 9 between the access point device 2 and one or more extender access point devices 3 can be implemented using any radio of the access point device 2 and any radio of the extender access point device 3. For example, the access point device 2 can utilize a radio 117 to establish a connection 9 to a radio 127A of extender access point device 3A and a radio 119 to establish a connection 8 to a radio 129B of extender access point device 3B. The connections 7, 8, 9, and 10 between the access point device 2, the network resource 6, the one or more extender access point devices 3, and the one or more client devices 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, any one or more connections can be implemented using a wireless connection that operates in accordance with, but is not limited to, RF4CE protocol, ZigBee protocol, Z-Wave protocol, or IEEE 802.15.4 protocol. It is also contemplated by the present disclosure that any one or more connections can include connections to a media over coax (MoCA) network.

The steering system 100 can include one or more extender access point devices 3, for example, extender access point devices 3A, 3B, and 3C, collectively referred to as extender access point devices 3. An extender access point device 3 can comprise one or more radios, for example, a 2.4 GHz radio 125 (such as radios 125A, 125B and 125C of extender access point devices 3A, 3B and 3C, respectively), a 5 GHz radio 127 (such as radios 127A, 127B, and 127C of extender access point devices 3A, 3B and 3C, respectively), a 6 GHz radio 129 (such as radios 129B and 129C of extender access point devices 3B and 3C, respectively), any other radio, or any combination thereof. The one or more extender access point devices 3 can be, for example, hardware electronic devices such as access points used to extend the wireless network by receiving the signals transmitted by the access point device 2 and rebroadcasting the signals to, for example, one or more client devices 4, which may be out of range of the access point device 2. The one or more extender access point devices 3 can also receive signals from the one or more other wireless devices, such as client devices 4, and rebroadcast the signals to the access point device 2 and/or other client devices 4.

One or more of the connections 11, 13 and 15 between respective extender access point devices 3 and one or more client devices 4 can be implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands.

The connection 8 between respective extender access point devices 3 and an access point device 2 can be implemented using the 6 GHz radio 129 of a wireless extenders 3, for example.

The connection 8 enables the wireless extenders 3 to establish a dedicated 6 GHz wireless backhaul (6 GHz BH) according to example embodiments of the present disclosure. For example, a radio 129B of an extender access point device 3B and radio 119 of access point device 2 can be utilized to establish a wireless BH. However, the connection 8 could also be implemented using respective wired interfaces (such as Ethernet, cable, fiber optic, or the like) in some alternative example embodiments.

The steering system 100 can include one or more client devices 4, for example, client devices 4A, 4B, 4C, 4D, 4E, 4F, and 4G, collectively referred to as client device(s) 4. A client device 4 can include a radio such as a 2.4 GHz radio 135 (such as radios 135A, 135C, 135E, and 135G of client devices 4A, 4E and 4G, respectively), a 5 GHz radio 137 (such as radios 137B and 137D of client devices 4B and 4D, respectively), a 6 GHz 139 (such as radio 139F of client device 4F), any other radio, or any combination thereof. The client devices 4 can be referred to as a station or a non-access point device and can be, for example, hand-held computing devices, personal computers, electronic tablets, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the access point device 2. Additionally, the client devices 4 can be a television (TV), an IP/QAM set-top box (STB) or a streaming media decoder (SMD) that is capable of decoding audio/video content, and playing over OTT or MSO provided content received through the access point device 2.

The connection 7 between the access point device 2 and the client device 4 can be implemented through a wireless connection that operates in accordance with, but is not limited to, any IEEE 802.11 protocols. The connection 7 between the client device 4G and the access point device 2 can be implemented using the 2.4 GHz radio 135G of the client device 4G and the 2.4 GHz radio 115 of the access point device 2, for example. The connection 7 enables the access point device 2 and the client device 4 to establish a 2.4 GHz wireless fronthaul (2 GHz FH) according to example embodiments of the present disclosure.

The connections 7, 11, 13, and 17 between one or more extender access point devices 3 and one or more other extender access point devices 3 or one or more client devices 4 is implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, any of these connection can be implemented using a wireless connection that operates in accordance with, but is not limited to, RF4CE protocol, ZigBee protocol, Z-Wave protocol, or IEEE 802.15.4 protocol.

Figure 2:
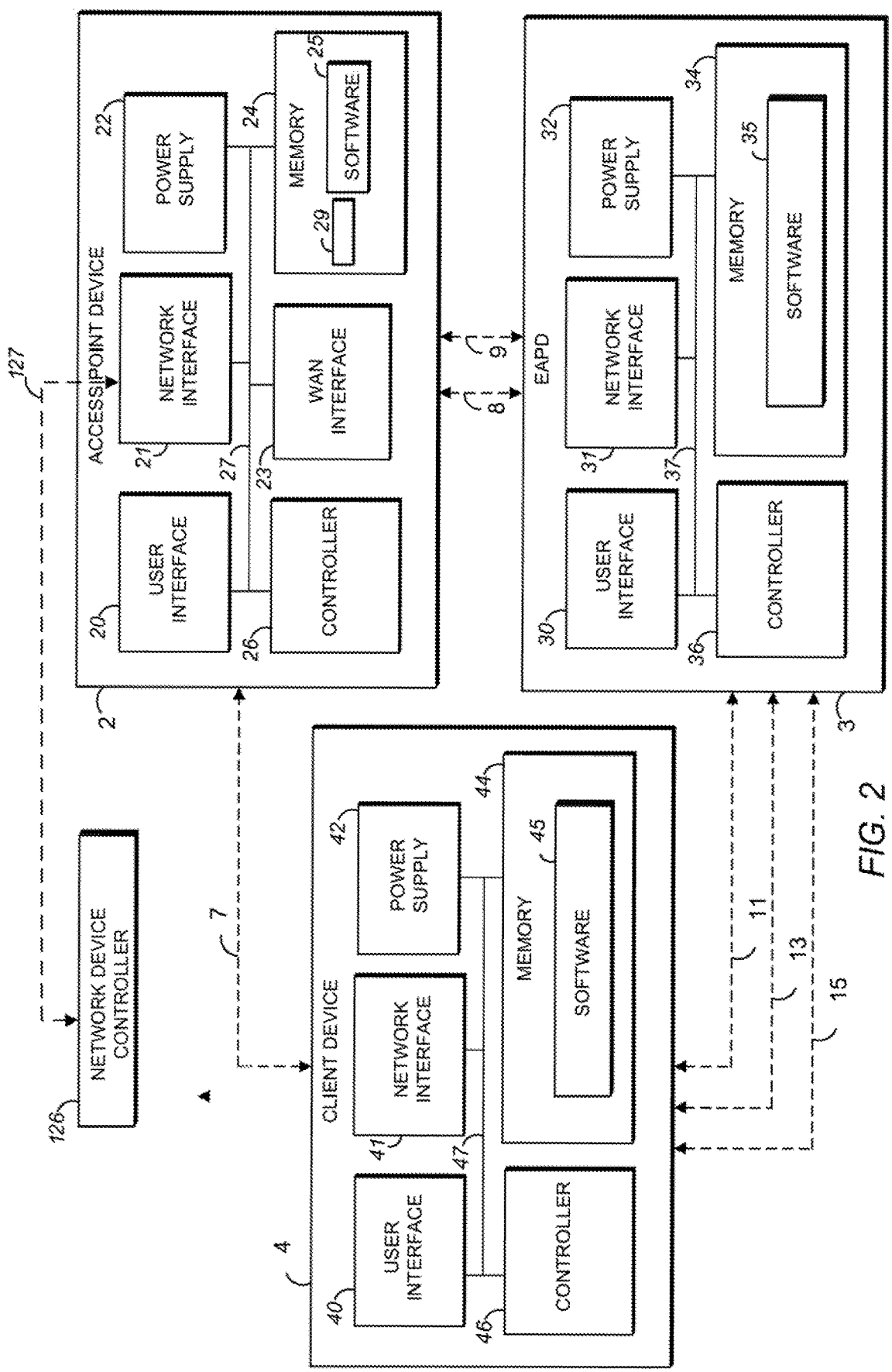
FIG. 2 is a more detailed block diagram illustrating various components of an exemplary access point device, client device, and extender access point device implemented in a network environment, according to one or more aspects of the present disclosure.

A more detailed description of the exemplary internal components of the access point device 2, the wireless extender access point devices 3, and the client devices 4 shown in FIG. 1 will be provided in the discussion of FIG. 2. However, in general, it is contemplated by the present disclosure that the access point device 2, the extender access point device 3, and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the access point device 2, the extender access point devices 3, and the client devices 4, may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, and the client devices 4 are further equipped with components to facilitate communication with other computing devices over the one or more network connections to local and wide area networks, wireless and wired networks, public and private networks, and any other communication network enabling communication in the system.

FIG. 2 is a more detailed block diagram illustrating various components of a network environment, according to one or more aspects of the present disclosure.

Although FIG. 2 only shows one access point device 2, one extender access point device 3 and one client device 4, the access point device 2, the extender access point device 3 and the client device 4 shown in the figure are meant to be representative of any number of access point devices 2, extender access point devices 3 and client devices 4. Similarly, the connections 127, 8, 9, and 11 associated with the network controller device 127, access point device 2, the wireless extender access point device 3, and the client device 4 shown in FIG. 2 are meant to be exemplary connections and are not meant to indicate all possible connections between the access point devices 2, extender access point devices 3, and client devices 4. Additionally, it is contemplated by the present disclosure that the number of access point devices 2, extender access point devices 3, and client devices 4 is not limited to the number of access point devices 2, extender access point devices 3, and client devices 4 shown in FIGS. 1 and 2.

Now referring to FIG. 2 (for example, from left to right), the client device 4 can be, for example, a computer, a portable device, an electronic tablet, an e-reader, a PDA, a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the access point device 2. Additionally, the client device 4 can be a TV, an IP/QAM STB, or an SMD that is capable of decoding audio/video content, and playing over OTT or MSO provided content received through the access point device 2.

As shown in FIG. 2, the client device 4 includes a user interface 40, a network interface 41, a power supply 42, a memory 44, and a local controller 46. The user interface 40 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities to allow interaction between a user and the client device 4. The network interface 41 can include, but is not limited to, various network cards, interfaces, and circuitry implemented in software and/or hardware to enable communications with the access point device 2 and the extender access point device 3 using the communication protocols in accordance with connections 7, 11, 13, and 15 (for example, as described with reference to FIG. 1). The network interface 41 can include multiple radios (for example, a 2.4 GHz radio, a 5 GHz radio, a 6 GHz radio, a 60 GHz radio, any other radio, or any combination thereof), which may also be referred to as wireless local area network (WLAN) interfaces. Any one or more of the radios can provide a fronthaul (FH) connection between the client device(s) 4 and the access point device 2 and/or the extender access point device 3.

The power supply 42 supplies power to the internal components of the client device 4 through the internal bus 47. The power supply 42 can be a self-contained power source such as a battery pack with an interface to be powered through an electrical charger connected to an outlet (for example, either directly or by way of another device). The power supply 42 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The memory 44 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 44 can be used to store any type of instructions, software, or algorithms including software 45 for controlling the general function and operations of the client device 4 in accordance with the embodiments described in the present disclosure.

The local controller 46 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 45 for controlling the operation and functions of the client device 4 in accordance with the embodiments described in the present disclosure. Communication between the components (for example, 40, 41, 42, 44, and/or 46) of the client device 4 may be established using an internal bus 47.

The extender access point device 3 can be, for example, a hardware electronic device such as an access point used to extend a wireless network by receiving the signals transmitted by the access point device 2 and rebroadcasting the signals to client devices 4, which may be out of range of the access point device 2. The extender access point device 3 can also receive signals from the client devices 4 and rebroadcast the signals to the access point device 2, or other client devices 4.

As shown in FIG. 2, the extender access point device 3 includes a user interface 30, a network interface 31, a power supply 32, a memory 34, and a local controller 36. The user interface 30 can include, but is not limited to, push buttons, a keyboard, a keypad, an LCD, a TFT, an LED, an HD or other similar display device including a display device having touch screen capabilities so as to allow interaction between a user and the wireless extender 3. The network interface 31 can include various network cards, interfaces, and circuitry implemented in software and/or hardware to enable communications with the client device 4 and the access point device 2 using the communication protocols in accordance with connections 8, 9, 11, 13, and/or 15 (for example, as described with reference to FIG. 1). For example, the network interface 31 can include multiple radios or sets of radios (for example, a 2.4 GHz radio, a 5 GHz radio, a 6 GHz radio, a 60 GHz radio, any other radio, or any combination thereof), which may also be referred to as wireless local area network (WLAN) interfaces. One radio or set of radios provides a backhaul (BH) connection between the extender access point device 3 and the access point device 2, and optionally other extender access point device(s) 3. The same one or set of radios, another radio or another set of radios provides a fronthaul (FH) connection between the extender access point device 3 and one or more client device(s)4.

The power supply 32 supplies power to the internal components of the wireless extender 3 through the internal bus 37. The power supply 32 can be connected to an electrical outlet (for example, either directly or by way of another device) via a cable or wire. The memory 34 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk, or any other various layers of memory hierarchy. The memory 34 can be used to store any type of instructions, software, or algorithm including software 35 associated with controlling the general functions and operations of the extender access point device 3 in accordance with the embodiments described in the present disclosure.

The local controller 36 controls the general operations of the extender access point device 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software including the software 35 for controlling the operation and functions of the extender access point device 3 in accordance with the embodiments described in the present disclosure. General communication between the components (for example, 30, 31, 32, 34, and/or 36) of the extender access point device 3 may be established using the internal bus 37.

The access point device 2 can be, for example, a hardware electronic device that can combine the functions of a modem, an access point (AP), and/or a router for providing content received from the content provider (ISP) 1 to network devices (for example, extender access point device 3, client devices 4) in the system. It is also contemplated by the present disclosure that the access point device 2 can include the function of, but is not limited to, an IP/QAM STB or SMD that is capable of decoding audio/video content, and playing OTT or MSO provided content.

As shown in FIG. 2, the access point device 2 includes a user interface 20, a network interface 21, a power supply 22, a wide area network (WAN) interface 23, a memory 24, and a controller 26. The user interface 20 can include, but is not limited to, push buttons, a keyboard, a keypad, an LCD, a TFT, an LED, an HD or other similar display device including a display device having touch screen capabilities so as to allow interaction between a user and the access point device 2. The network interface 21 may include various network cards, and circuitry implemented in software and/or hardware to enable communications with network controller device 126, the extender access point device 3 and the client device 4 using the communication protocols in accordance with connections 127, 7, 8, 9, 11, 13, and/or 15 (for example, as described with reference to FIG. 1). For example, the network interface 21 can include an Ethernet port (also referred to as a LAN interface) and multiple radios or sets of radios (for example, a 2.4 GHz radio, a 5 GHz radio, a 6 GHz radio, a 60 GHz radio, any other radio, or any combination thereof also referred to as WLAN interfaces). One radio or set of radios can provide a wireless backhaul (BH) connection between the access point device 2 and the extender access point device(s) 3. Another radio or set of radios can provide a fronthaul (FH) connection between the access point device 2 and one or more other wireless devices, such as one or more client device(s) 4.

The power supply 22 supplies power to the internal components of the access point device 2 through the internal bus 27. The power supply 22 can be connected to an electrical outlet (for example, either directly or by way of another device) via a cable or wire. The WAN interface 23 may include various network cards, and circuitry implemented in software and/or hardware to enable communications between the access point device 2 and the network resource 6 using, for example, a wireless protocol in accordance with connection 10 (for example, as described with reference to FIG. 1). For example, the WAN interface 23 can include an Ethernet port and one or more radios (for example, a 6 GHz radio). The WAN interface 23 (for example, a 6 GHz radio) may be used to provide a wireless backhaul (BH) connection between the access point device 2 and any one or more other elements, according to example embodiments of the present disclosure.

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk, or any other various layers of memory hierarchy. The memory 24 can be used to store any type of instructions, software, or algorithm including software 25 for controlling the general functions and operations of the access point device 2 and performing management functions related to the other devices (for example, extender access point devices 3 and client devices 4) in the network in accordance with the embodiments described in the present disclosure. The memory 24 can store one or more steering parameters 29 associated with one or more access point devices 2 within the steering system 100. The one or more steering parameters 29 can comprise one or more parameters associated with an access point device 2 (such as a target access point device or a candidate access point device) including, but not limited to, any of a target access point device indicator (as indicated in the association request frame), a signal strength associated with a corresponding association request frame, one or more band capabilities, one or more modulation capabilities, a spatial stream support information, one or more Wi-Fi mode capabilities (such as support for Wi-Fi 4, Wi-Fi 5, Wi-Fi 6, etc.), a channel load, an added channel load, a number of client devices already associated with the access point device, any other signal strength data, a throughput, a bandwidth, a type of radio, any other network performance parameter, any other capability, or any combination thereof.

Figure 3:
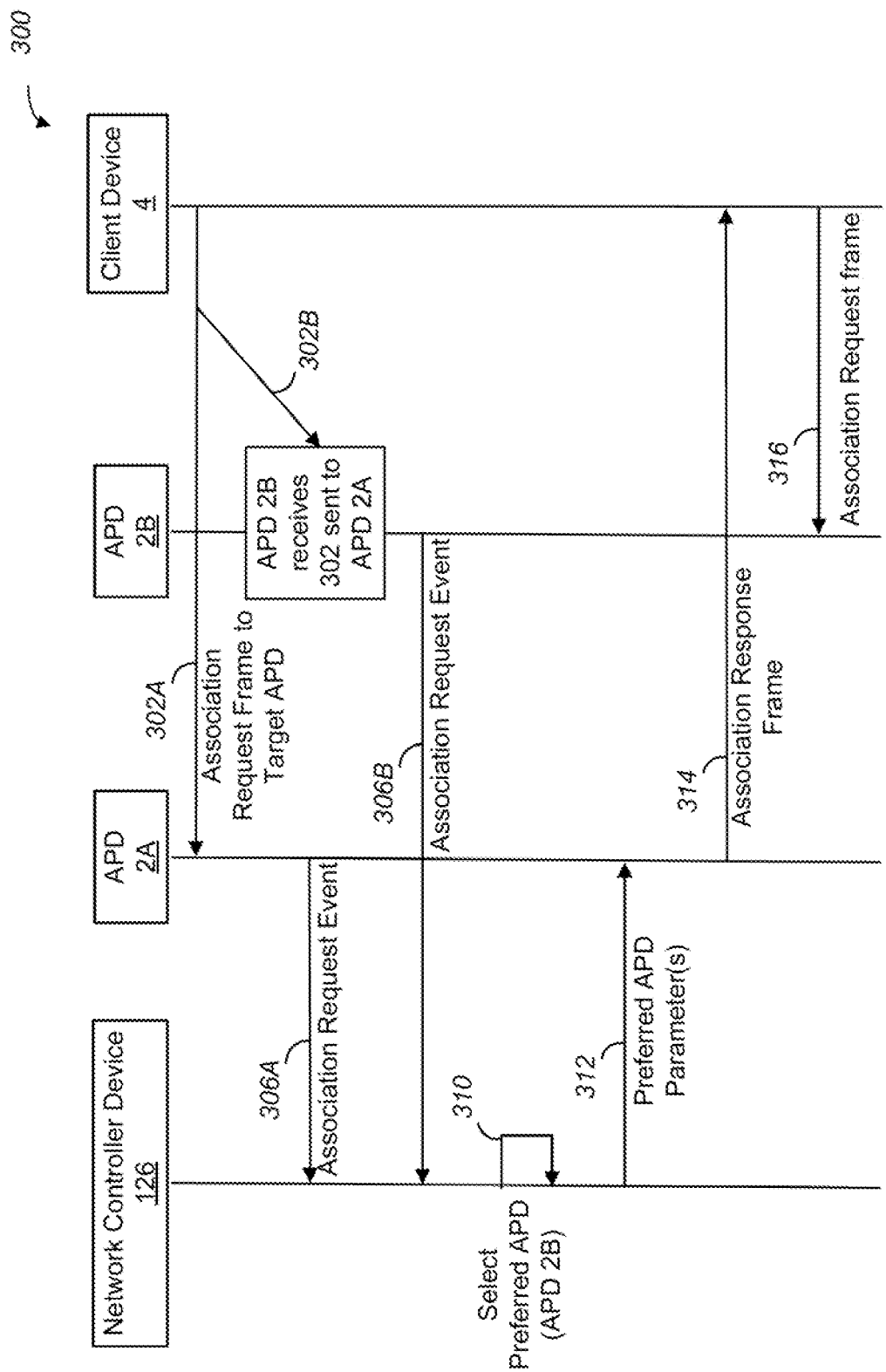
FIG. 3 is a flow diagram illustrating an association of a wireless device to an access point device, according to one or more aspects of the present disclosure.

The controller 26 controls the general operations of the access point device 2 as well as performs management functions related to the other devices (for example, extender access point device 3 and client device 4) in the network. The controller 26 can include, but is not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software including the software 25 for controlling the operation and functions of the access point device 2 in accordance with the embodiments described in the present disclosure. Communication between the components (for example, 20, 21, 22, 23, 24, and/or 26) of the access point device 2 may be established using the internal bus 27. The controller 26 may also be referred to as a processor, generally. In one or more embodiments, the controller 26 communicates with a network controller device 126 via a connection 127 between the network controller device 126 and the network interface 21. While FIG. 2 illustrates network controller device 126 as separate or distinct from the access point device 2, the present disclosure contemplates that the network controller device 126 can be part of or included within the access point device 2 as illustrated in FIG. 1. In one or more embodiments, the controller 26 comprises software, such as a software 25, hardware, such as any of components 20, 21 22, 23, 24, 25, and/or 26, or both. FIG. 3 is a flow diagram illustrating an association of a client device 4, such as a wireless device, to an access point device 2, according to one or more aspects of the present disclosure.

FIG. 3 illustrates a wireless network 300 that comprises a network controller device 126, an access point device 2A, an access point device 2B and a client device 4. Network controller device 126 can be included within or as part of access point device 2A or 2B or can be separate and distinct from any other network device in the wireless network 300. While FIG. 3 illustrates a client device 4, the present disclosure contemplates that client device 4 could be any wireless device capable of performing the steps as indicated in FIG. 3.

A client device 4 can attempt to associate with an access point device 2 in the wireless network 300. For example, the client device 4 can send an association request frame 302A across the network that is directed to a target access point device, such as access point device 2A. One or more other access point devices 2 in the network can also receive an association request frame 302, such as a candidate access point device 2B can receive the association request frame 302B. The association request frames 302A and 302B received by the one or more access point devices 2 are the same except that association request frame 302A is directed to access point device 2A and is received by access point device 2A while association request frame 302B is directed to access point device 2A but received by access point device 2B. A header or any other field of an association request frame 302 (such as association request frames 302A and/or 302B, collectively referred to as association request frame(s) 302) can indicate the access point device 2 that is the target of the association request frame 302 sent by the client device 4, in this example referred to as the target access point device 2A. Each access point device 2 that received or captured an association request frame 302 can send an association request event 306 to the network controller device 126. For example, the target access point device 2A can send an association request event 306A associated with the association request frame 302A and candidate access point device 2B can send an associate request event 306B associated with the captured association request frame 302B. Each association request event 306 can comprise one or more steering parameters 29, for example, as discussed with reference to FIG. 2. The target access point device indicator indicates an access point device 2 that the client device 4 requests association with, referred to as a target access point device (such as target access point device 2A). In one or more embodiments, the target access point device indicator indicates a radio or a frequency band associated with the target access point device.

The network controller device 126 can analyze the one or more steering parameters 29 received as part of each of the association request events 306 (such as from association request events 306A and 306B associated with association request frames 302A and 302B, respectively). The network controller device 126 can select a preferred access point device 310 of the plurality of access point devices 2 in the network 300 based on the received one or more steering parameters 29 associated with the one or more association request events 306. For example, the network controller device 126 can select access point device 2B as the preferred access point device based on an estimate of the increased channel loading for each of the access point devices that sent an association request event. The increased channel loading can be determined utilizing any one or more of the one or more steering parameters 29 received as part of any of the received association request events 306. In one or more embodiments, selecting the preferred access point device 310 comprises selecting a particular channel of an access point device, referred to as band steering, with the access point device indicator indicating the frequency band or radio associated with the preferred access point device. The network controller device 126 determines one or more preferred access point device parameters based on the selected preferred access point device. The network controller device 126 sends the one or more preferred access point device parameters 312 to the target access point device 2A. The one or more preferred access point device parameters 312 can comprise any of a preferred access point device indicator that identifies or otherwise indicates the preferred access point device, a radio or frequency band of the preferred access point device, or both, a time period or duration that the one or more preferred access point device parameters 312 are valid or when such expire, any other parameter, or any combination thereof.

Figure 7:
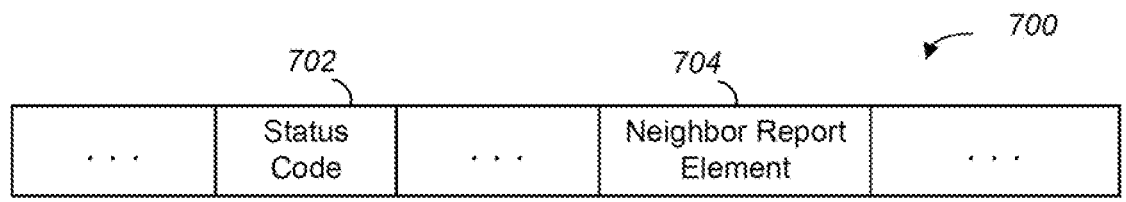
FIG. 7 illustrates an association response format that indicates a wireless device is to move to another basic service set identifier (BSSID), according to one or more aspects of the present disclosure.
Figure 8:
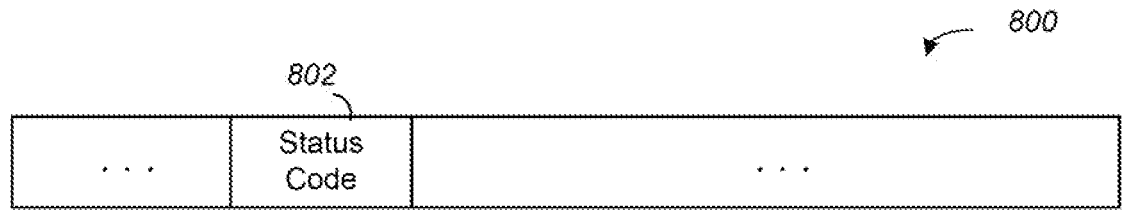
FIG. 8 illustrates an association response format that indicates a wireless device is to join an original BSSID, according to one or more aspects of the present disclosure.

The target access point device 2A can send an association response frame 314 to the client device 4 that indicates the preferred access point device as selected by the network controller device 126, such as any one or more of the one or more preferred access point device parameters. For example, the association response frame 314 can indicate that access point device 2B is the preferred access point device and that the client device 4 should attempt association with access point device 2B. The association response frame 314 can have an association response format 700 of FIG. 7 that comprises a status code 702 set to "REJECTED_WITH_SUGGESTED_BSS_TRANSITION" or a value of "82" that indicates that the preferred access point device is different than the target access point device and a Neighbor Report element 704 (for example, the Neighbor Report element 704 can comprise one or more fields as defined by the IEEE 802.11 standard). For example, an association response frame 314 with a format 700 indicates a wireless device is to move (or associate) to another BSSID. Client device 4 can send an association request frame 316 to the preferred access point device 2B to attempt to associate with access point device 2B based on the association response frame 314. In one or more embodiments, if the preferred access point device is the same as the target access point device, then, for example, the access point device 2A allows the client device 4 to associate with the access point device 2A (such as the access point device 2A sends an association response frame 314 that comprises an association response format 800 of FIG. 8) and thus association request frame 316 is omitted. The association response format 800 of FIG. 8 can comprise a status code of "SUCCESS" or a value of "1". For example, an association response frame 314 with a format 800 indicates that a wireless device is to join an original BSSID, the BSSID associated with the target access point device.

Figure 4:
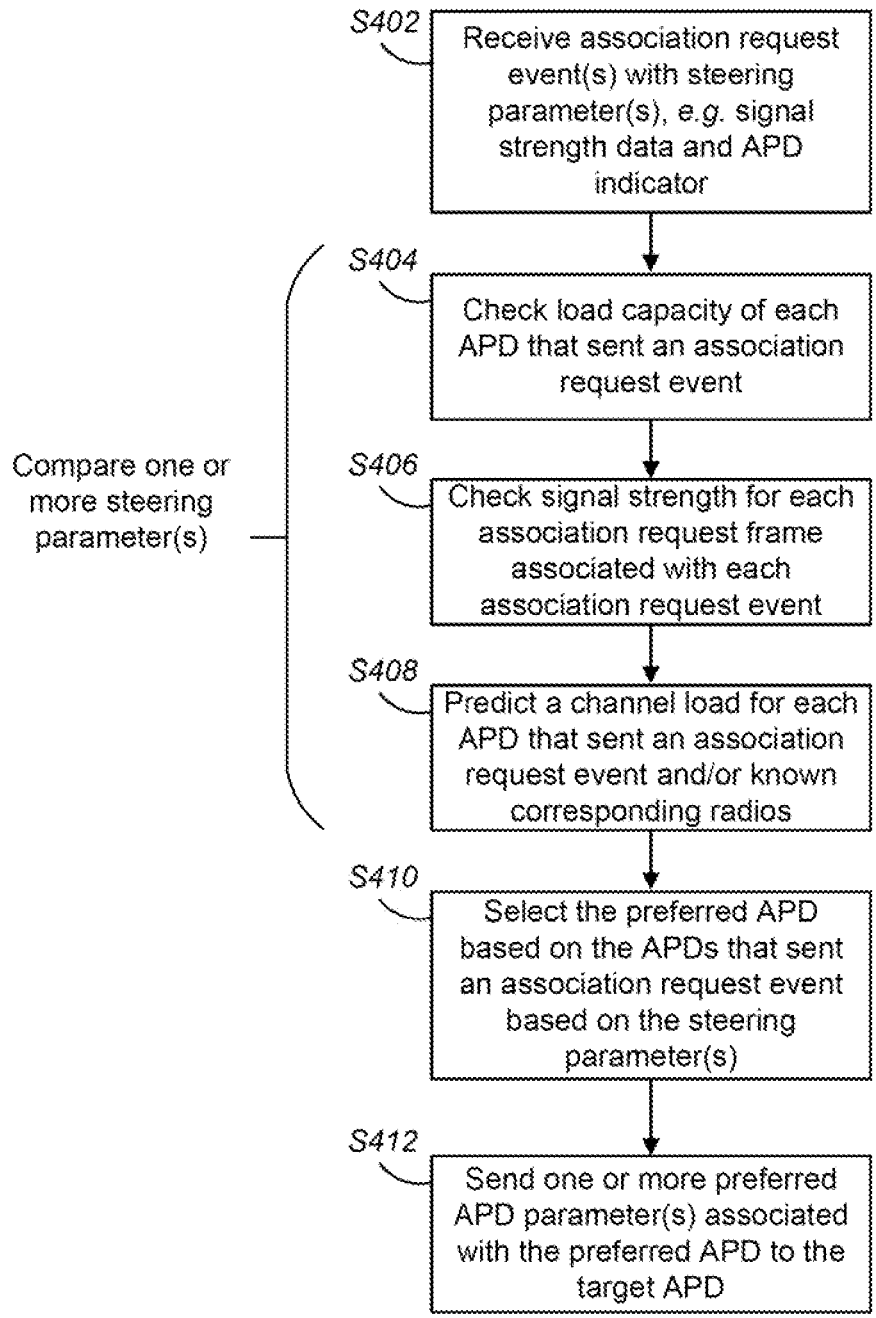
FIG. 4 illustrates a flow chart for a network controller device to determine or select a preferred access point device, according to one or more aspects of the present disclosure.

FIG. 4 illustrates a flow chart for a network controller device, such as network controller device 126, to determine or select a preferred access point device, according to one or more aspects of the present disclosure. The network controller device 126 may comprise one or more elements or be part of an access point device 2 discussed with reference to FIGS. 1 and 2. The network controller device 126 can be programmed with one or more computer-readable instructions that when executed by the network controller device 126 cause the network controller device 126 to select or determine a preferred access point device so as to steer a wireless device, such as a client device 4 (or a station) and/or an extender access point device 3, to or allow the wireless device to associate with a preferred access point device, according to one or more aspects of the present disclosure so as to provide an enhanced QoE.

At step S402, the network controller device 126 receives one or more association request events from one or more access point devices in the network that received an association request frame sent by a wireless device in the network and directed to a target access point device. For example, a client device 4 can send an association request frame directed to a target access point device 2A that is received by one or more access point devices 2 in the network. The one or more access point devices 2 in then network can comprise the target access point device that the association request frame was directed to, one or more other (or candidate) access point devices that received or captured the association request frame, or both. The one or more association request events can comprise one or more steering parameters.

To determine or select a preferred access point device, a network controller device 126 can compare one or more steering parameters associated with each access point device 2 that sent an association request event to the network controller device 126. For example, the network controller device 126 can at any of step S404, check a load capacity of each access point device that sent an association request event, step S406, check a signal strength for each association request frame associated with each association request event from a respective access point device 2, step S408, predict a channel load for each access point device 2 that sent an association request event to the network controller device 126 and/or any one or more known corresponding radios, or any combination thereof. The predicted channel load can be used by the network controller device 126 in step S410.

At step S410, the network controller device 126 can select a preferred access point device from the access point devices 2 that sent an association request event based on the one or more steering parameters, for example, based on any of steps S404, S406, S408, or any combination thereof. The network controller device 126 can determine or set one or more preferred access point device parameters based on the preferred access point device. At step S412, the network controller device 126 sends one or more preferred access point device parameters associated with the preferred access point device from step S410 to the target access point device, the access point device that was the target of the association request frame from the client device 4. For example, the access point device indicator can indicate that the association with the target access point device is allowed by, for example, indicating "SUCCESS". or that another access point device has been selected for the client device 4 to associate with by indicating that the preferred access point device (or a radio) is different than the target access point device (or a radio of the target access point device. In one or more embodiments, the network controller device 126 stores the one or more preferred access point device parameters for a time period or a duration, for example, the one or more preferred access point device parameters 312 can comprise a time period that indicates a period of time that the one or more access point device parameters 312 are valid or expired, for example, so that if the client device 4 attempts to associate with an access point device previously selected as the preferred access point the device, the network controller device 126 need not perform steps S402-S412 but rather can use the previously stored one or more preferred access point device parameters to identify or select the preferred access point device as long as the time period has not expired. For example, the time period can indicate any of a start time, an end time, a timer, any value of time, such as any of day(s), week(s), hour(s), minute(s), second(s), any other measure of time, or any combination thereof.

Figure 5:
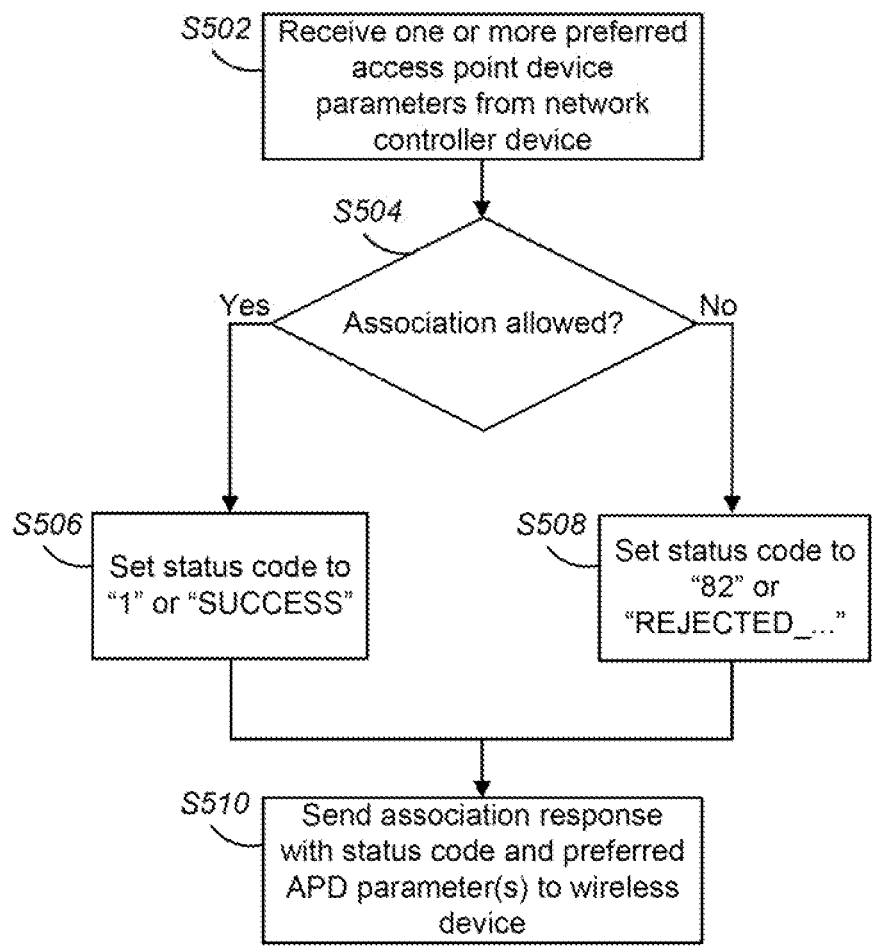
FIG. 5 illustrates a flow chart for a target access point device to send an association response to a wireless device, according to one or more aspects of the present disclosure.

FIG. 5 illustrates a flow chart for a target access point device to send an association request response to a client device, according to one or more aspects of the present disclosure. The target access point device may comprise one or more elements discussed with reference to FIGS. 1 and 2. The target access point device can be programmed with one or more computer-readable instructions such as a software 25 that when executed by a controller, such as a controller 26, cause the target access point device to send an association request response to a client device 4 so as to steer the client device 4 to or allow the client device 4 to associate with a selected preferred access point device, according to one or more aspects of the present disclosure so as to provide an enhanced QoE.

At step S502, the target access point device receives one or more preferred access point device parameters from a network controller device 126. At step S504, the target access point device determines if the association to the target access point device is allowed. If the association to the target access point device is allowed, at step S506, the target access point device sets a status code of an association response frame to indicate that the association to the target access point device is allowed, for example, a status code 802 of FIG. 8. If the association to the target access point device is not allowed, at step S508, the target access point device sets a status code of an association response frame to indicate that the client device 4 should be steered to the selected preferred access point device, for example, a status code 702 of FIG. 7. At step S510, the target access point device sends an association response with a status code to the wireless device so as to steer the wireless device to or allow the wireless device to associate with the preferred access point device.

Figure 6:
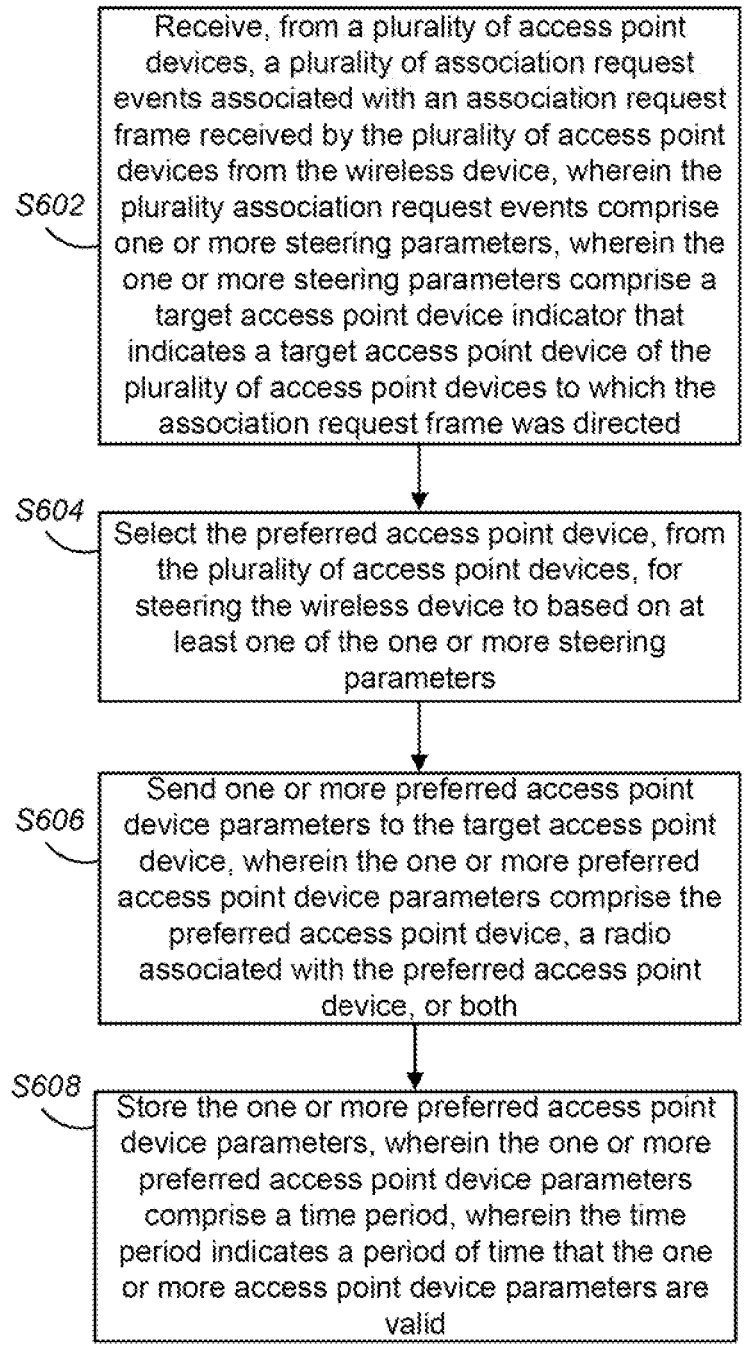
FIG. 6 illustrates a flow chart for a network controller device to determine a preferred access point device, according to one or more aspects of the present disclosure.

FIG. 6 illustrates a flow chart for a network controller device 126 to determine a preferred access point device, according to one or more aspects of the present disclosure. At step S602, the network controller device 126 can receive, from a plurality of access point devices 2 in a network, a plurality of association request events associated with an association request frame received by the plurality of access point devices 2 from a wireless device, such as a client device 4, an extender access point device 3, or both. For example, as discussed with reference to FIG. 3, an access point device 2A and an access point device 2B can each receive an association request frame, such as association request frames 302A and 302B, respectively, and can each send to the network controller device 126 an association request event 306A and 306B, respectively. Each of the plurality of association request events comprise one or more steering parameters. The one or more steering parameters comprise a target access point device indicator that indicates a target access point device of the plurality of access point devices to which the association request frame was directed. The target access point device indicator is the same for each of the plurality of access point devices as each of the plurality of access point devices receives or otherwise captures the association request frame from the wireless device. The one or more steering parameters can comprise one or more parameters that are associated with a particular access point device of the plurality of access point devices, for example, a parameter that indicates a channel load, a signal strength, etc. that is associated with the particular access point device.

At step S604, the network controller device 126 selects the preferred access point device, from the plurality of access point devices, for steering the wireless device to based on at least one of the one or more steering parameters. For example, an access point device 2A and an access point device 2B can each send an associated association request event to the network controller device 126 with each of the associated association request events comprising one or more steering parameters. The network controller device 126 can any of predict a channel load, determine a load capacity, determine a load capacity, determine a signal strength of each of the one or more association event requests, determine a predicted network performance, or any combination thereof of each of the plurality of access point devices (such as access point devices 2A and 2B) based on the one or more steering parameters. In one or more embodiments, the predicting the channel load for each of a plurality of access point devices that sent an associated plurality of association request events, one or more radios corresponding to any of the plurality of access point devices, or both is based on one or more of the one or more steering parameters, such as the load capacity, the signal strength, or both and the selecting the preferred access point device can be based on the predicted channel load.

At step S606, the network controller device 126 sends one or more referred access point device parameters to the target access point device, for example, as indicated by the target access point device indicator of the one or more steering parameters. The one or more preferred access point device parameters can comprise the preferred access point device indicative of the preferred access point device, a radio associated with the preferred access point device, or both. For example, a unique identifier can be associated with the preferred access point device, a radio associated with the preferred access point device, or both and the one or more access point device parameters can include the unique identifier. The target access point device can send an association response with a status code and the one or more preferred access point device parameters to the wireless device so as to steer the wireless device to or allow the wireless device to associate with the preferred access point device.

At step S608, the network controller device 126 stores the one or more preferred access point device parameters, for example, in a memory of the network controller device 126, a network resource 6, or any other storage medium. The one or more preferred access point device parameters can comprise a time period that indicates a period of time that the one or more access point device parameters are valid, for example, that an association with the preferred access point device is valid. For example, the network controller device 126 can automatically select the preferred access point device during the time period or before expiration of the time period without having to perform any determination or selection of the preferred access point device, for example, as discussed with reference to step S604.

In one or more embodiments, any one or more of steps S602-S608 can be repeated. For example, the network controller 126 can receive, from at least one of the plurality of access point devices, one or more subsequent association request events associated with a subsequent association request frame received by the at least one of the plurality of access point devices. The one or more subsequent association request events comprise one or more subsequent steering parameters and the one or more subsequent steering parameters comprise a subsequent target access point device indicator that indicates a subsequent target access point device to which the subsequent association request frame was directed. For example, a wireless device can disconnect from the network and then subsequently attempt a re-association to an access point device of the plurality of access point devices. The network controller device 126 can perform the previously discussed steps including, but not limited to, determining that the one or more subsequent association request events are associated with the wireless device, determining that the time period associated with the stored one or more preferred access point device parameters associated with the preferred access point device has not expired, and sending the one or more preferred access point device parameters to the subsequent target access point device based on the subsequent target access point device indicator so as to steer the wireless device to or allow the wireless device to associate with the preferred access point device. As the one or more access point device parameters have not expired or are still valid, the network controller device 126 does not need to make any further determination and can steer the wireless device to the preferred access point device previously selected. In this way, network resources are conserved by not repeating the determination steps and communicates of step S604.

In FIGS. 4-6, it is assumed that any one or more of the devices include their respective controllers and their respective software stored in their respective memories, as discussed above in connection with FIGS. 1-3, which when executed by their respective controllers perform the functions and operations in accordance with the example embodiments of the present disclosure (for example, including performing a configuration of one or more network devices). While the steps S402-S412, S502-S510, and S602-S608 are presented in a certain order, the present disclosure contemplates that any one or more steps can be performed simultaneously, substantially simultaneously, repeatedly, in any order or not at all (omitted).

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the preceding embodiments may be implemented using program instructions, an operating system (such as a driver for an interface or device), or in firmware. Alternatively, or additionally, at least some of the operations in the communication technique may be implemented in a physical layer, such as hardware.

In the preceding description, we refer to "some embodiments." Note that "embodiments" or "some embodiments" describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure.

Additionally, the discussion of the preceding embodiments is not intended to limit the present disclosure. Thus, the present disclosure is not intended to be limited to the embodiments shown, but is to be accorded the widest scope consistent with the principles and features disclosed herein.

I claim:

1. A method for steering a wireless device to a preferred access point device in a wireless network, the method comprising:
   receiving, from a plurality of access point devices comprising a first access point device and a second access point device, a plurality of association request events associated with an association request frame received by the plurality of access point devices from the wireless device, wherein the plurality of association request events comprise one or more steering parameters, wherein the one or more steering parameters comprise a target access point device indicator that indicates a target access point device of the plurality of access point devices to which the association request frame was directed;
   selecting the preferred access point device, from the plurality of access point devices, for steering the wireless device to based on at least one of the one or more steering parameters; and
   sending one or more preferred access point device parameters to the target access point device, wherein the one or more preferred access point device parameters comprise a preferred access point device indicator that is indicative of the preferred access point device, a radio associated with the preferred access point device, or both,
   wherein the target access point device indicator indicates that the first access point device is the target access point device, and
   wherein the association request events received from both the first access point device and the second access point device comprise the target access point device indicator that indicates that the first access point device is the target access point device.

2. The method of claim 1, further comprising:
   predicting a channel load of each of the plurality of access point devices, one or more radios corresponding to any of the plurality of access point devices, or both based on one or more of the one or more steering parameters, wherein the selecting is based on the predicted channel load.

3. The method of claim 2, further comprising at least one of:
   determining a load capacity of each of the plurality of access point devices based on the one or more steering parameters; and
   determining a signal strength of each of the one or more association event requests based on any of the one or more steering parameters,
   wherein the predicting the channel load is based on the load capacity, the signal strength, or both.

4. The method of claim 1, wherein the selecting the preferred access point device comprises comparing the one or more steering parameters to determine a predicted network performance associated with each of the plurality of access point devices.

5. The method of claim 1, further comprising:
   storing the one or more preferred access point device parameters, wherein the one or more preferred access point device parameters comprise a time period, wherein the time period indicates a period of time that the one or more access point device parameters are valid.

6. The method of claim 5, further comprising:
   receiving, from at least one of the plurality of access point devices, one or more subsequent association request events associated with a subsequent association request frame received by the at least one of the plurality of access point devices, wherein the one or more subsequent association request events comprise one or more subsequent steering parameters, wherein the one or more subsequent steering parameters comprise a subsequent target access point device indicator that indicates a subsequent target access point device to which the subsequent association request frame was directed;
   determining that the one or more subsequent association request events are associated with the wireless device;
   determining that the time period associated with the stored one or more preferred access point device parameters associated with the preferred access point device has not expired; and
   sending the one or more preferred access point device parameters to the subsequent target access point device based on the subsequent target access point device indicator so as to steer the wireless device to or allow the wireless device to associate with the preferred access point device.

7. The method of claim 1, wherein the preferred access point device is the same as the target access point device.

8. A network controller device for steering a wireless device to a preferred access point device in a wireless network, the network controller device comprising:
   a memory storing one or more computer-readable instructions;
   a processor coupled to the memory, the processor configured to execute the one or more computer-readable instructions stored on the memory to cause the network controller device to:
   receive, from a plurality of access point devices, a plurality of association request events associated with an association request frame received by the plurality of access point devices from the wireless device, wherein the plurality of access point devices comprise a first access point device and a second access point device, wherein the plurality of association request events comprise one or more steering parameters, and wherein the one or more steering parameters comprise a target access point device indicator that indicates a target access point device of the plurality of access point devices to which the association request frame was directed;
   select the preferred access point device, from the plurality of access point devices, for steering the wireless device to based on at least one of the one or more steering parameters; and
   send one or more preferred access point device parameters to the target access point device, wherein the one or more preferred access point device parameters comprise a preferred access point device indicator that is indicative of the preferred access point device, a radio associated with the preferred access point device, or both,
   wherein the target access point device indicator indicates that the first access point device is the target access point device, and
   wherein the association request events received from both the first access point device and the second access point device comprise the target access point device indicator that indicates that the first access point device is the target access point device.

9. The network controller device of claim 8, wherein the processor is further configured to execute the one or more computer-readable instructions to further cause the network controller device to:
   predict a channel load of each of the plurality of access point devices, one or more radios corresponding to any of the plurality of access point devices, or both based on one or more of the one or more steering parameters, wherein the selecting is based on the predicted channel load.

10. The network controller device of claim 9, wherein the processor is further configured to execute the one or more computer-readable instructions to further cause the network controller device to at least one of:
   determine a load capacity of each of the plurality of access point devices based on the one or more steering parameters; and
   determine a signal strength of each of the one or more association event requests based on any of the one or more steering parameters,
   wherein the predicting the channel load is based on the load capacity, the signal strength, or both.

11. The network controller device of claim 8, wherein the selecting the preferred access point device comprises comparing the one or more steering parameters to determine a predicted network performance associated with each of the plurality of access point devices.

12. The network controller device of claim 8, wherein the processor is further configured to execute the one or more computer-readable instructions to further cause the network controller device to:
   store the one or more preferred access point device parameters, wherein the one or more preferred access point device parameters comprise a time period, wherein the time period indicates a period of time that the one or more access point device parameters are valid.

13. The network controller device of claim 12, wherein the processor is further configured to execute the one or more computer-readable instructions to further cause the network controller device to:
   receive, from at least one of the plurality of access point devices, one or more subsequent association request events associated with a subsequent association request frame received by the at least one of the plurality of access point devices, wherein the one or more subsequent association request events comprise one or more subsequent steering parameters, wherein the one or more subsequent steering parameters comprise a subsequent target access point device indicator that indicates a subsequent target access point device to which the subsequent association request frame was directed;
   determine that the one or more subsequent association request events are associated with the wireless device;
   determine that the time period associated with the stored one or more preferred access point device parameters associated with the preferred access point device has not expired; and
   send the one or more preferred access point device parameters to the subsequent target access point device based on the subsequent target access point device indicator so as to steer the wireless device to or allow the wireless device to associate with the preferred access point device.

14. The network controller device of claim 8, wherein the preferred access point device is the same as the target access point device.

15. A non-transitory, computer-readable medium of a network controller device storing one or more computer-readable instructions that when executed by a processor of the network controller device, cause the network controller device to perform one or more operations comprising:
   receiving, from a plurality of access point devices, a plurality of association request events associated with an association request frame received by the plurality of access point devices from a wireless device, wherein the plurality of access point devices comprise a first access point device and a second access point device, wherein the plurality of association request events comprise one or more steering parameters, and wherein the one or more steering parameters comprise a target access point device indicator that indicates a target access point device of the plurality of access point devices to which the association request frame was directed;
   selecting a preferred access point device, from the plurality of access point devices, for steering the wireless device to based on at least one of the one or more steering parameters; and
   sending one or more preferred access point device parameters to the target access point device, wherein the one or more preferred access point device parameters comprise a preferred access point device indicator that is indicative of the preferred access point device, a radio associated with the preferred access point device, or both,
   wherein the target access point device indicator indicates that the first access point device is the target access point device, and
   wherein the association request events received from both the first access point device and the second access point device comprise the target access point device indicator that indicates that the first access point device is the target access point device.

16. The non-transitory, computer-readable medium of claim 15, wherein the one or more computer-readable instructions when executed by the processor, further cause the processor to perform the one or more operations further comprising:
   predicting a channel load of each of the plurality of access point devices, one or more radios corresponding to any of the plurality of access point devices, or both based on one or more of the one or more steering parameters, wherein the selecting is based on the predicted channel load.

17. The non-transitory, computer-readable medium of claim 16, wherein the one or more computer-readable instructions when executed by the processor, further cause the processor to perform the one or more operations further comprising:
   determining a load capacity of each of the plurality of access point devices based on the one or more steering parameters; and
   determining a signal strength of each of the one or more association event requests based on any of the one or more steering parameters,
   wherein the predicting the channel load is based on the load capacity, the signal strength, or both.

18. The non-transitory, computer-readable medium of claim 15, wherein at least one of:

the selecting the preferred access point device comprises comparing the one or more steering parameters to determine a predicted network performance associated with each of the plurality of access point devices; and
the preferred access point device is the same as the target access point device.

19. The non-transitory, computer-readable medium of claim 15, wherein the one or more computer-readable instructions when executed by the processor, further cause the processor to perform the one or more operations further comprising:
storing the one or more preferred access point device parameters, wherein the one or more preferred access point device parameters comprise a time period, wherein the time period indicates a period of time that the one or more access point device parameters are valid.

20. The non-transitory, computer-readable medium of claim 19, wherein the one or more computer-readable instructions when executed by the processor, further cause the processor to perform the one or more operations further comprising:
receiving, from at least one of the plurality of access point devices, one or more subsequent association request events associated with a subsequent association request frame received by the at least one of the plurality of access point devices, wherein the one or more subsequent association request events comprise one or more subsequent steering parameters, wherein the one or more subsequent steering parameters comprise a subsequent target access point device indicator that indicates a subsequent target access point device to which the subsequent association request frame was directed;
determining that the one or more subsequent association request events are associated with the wireless device;
determining that the time period associated with the stored one or more preferred access point device parameters associated with the preferred access point device has not expired; and
sending the one or more preferred access point device parameters to the subsequent target access point device based on the subsequent target access point device indicator so as to steer the wireless device to or allow the wireless device to associate with the preferred access point device.

* * * * *